(12) United States Patent
Suptitz et al.

(10) Patent No.: US 6,437,952 B1
(45) Date of Patent: Aug. 20, 2002

(54) EARTH PROTECTION DEVICE SENSITIVE TO ARC CURRENTS, TRIP DEVICE AND CIRCUIT BREAKER COMPRISING SUCH A DEVICE

(75) Inventors: Eric Suptitz, Montaud; Pierre Blanchard, Voreppe, both of (FR)

(73) Assignee: Square D Company, Palatine, IL (US)

( * ) Notice: Subject to any disclaimer, the term of this patent is extended or adjusted under 35 U.S.C. 154(b) by 50 days.

(21) Appl. No.: 09/617,124

(22) Filed: Jul. 14, 2000

(30) Foreign Application Priority Data

Sep. 10, 1999 (FR) .............................. 99 11489

(51) Int. Cl.$^7$ .............................. H02H 3/00; H02H 3/16
(52) U.S. Cl. ..................... 361/42; 361/93.2; 324/76.17; 324/76.15; 702/58; 702/65
(58) Field of Search .............................. 361/42, 44, 45, 361/93.1, 93.2; 324/500, 522, 76.15, 76.17; 702/57, 58, 64, 65

(56) References Cited

U.S. PATENT DOCUMENTS 5,751,284 A * 5/1998 Suptitz et al. .............. 324/127

FOREIGN PATENT DOCUMENTS

| EP | 0 802 602 | 10/1997 |
|----|-----------|---------|
| EP | 0 813 281 | 12/1997 |

* cited by examiner

Primary Examiner—Kim Huynh
(74) Attorney, Agent, or Firm—Parkhurst & Wendel, LLP

(57) ABSTRACT

An earth protection device having an input for receiving a first signal representative of an earth fault current, a first signal processing module, and a module for processing protection functions connected to the first signal processing module. The device includes a second signal processing module connected between the input and the first signal processing module for processing the first signal representative of the earth fault current and for supplying to the first signal processing module a second signal representative of the earth fault current. In order to increase the value of the second signal over an RMS value when the fault current comprises pulses of short duration, the second signal has, at decreasing second signal values, a gradient lower than a preset gradient limiting value.

12 Claims, 5 Drawing Sheets

EARTH PROTECTION DEVICE SENSITIVE TO ARC CURRENTS, TRIP DEVICE AND CIRCUIT BREAKER COMPRISING SUCH A DEVICE

BACKGROUND OF THE INVENTION

The invention relates to an earth protection device comprising an input to receive a first signal representative of an earth fault current, first signal processing means to process a signal representative of an earth fault current, and means for processing protection functions connected to the first signal processing means.

Known earth protection devices installed in trip devices or circuit breakers comprise means for detecting zero-phase sequence or earth fault currents. These currents are generally detected by making the vector sum of all the line currents, i.e. the phase currents and the neutral current.

This vector sum can be obtained by measuring currents separately in each line conductor with independent sensors, and a device then determines an earth fault current signal by making the sum of the measured signals. It is also possible to measure an earth fault current by using a sensor which surrounds all the conductors. A signal supplied by such a sensor is directly representative of an earth fault current.

The signals representative of earth fault current are used in protection functions to command opening of the circuit breaker contacts or to indicate the presence of earth fault current.

In known earth protection devices, the signals representative of fault currents are processed to extract an rms value of said signals. However, when the fault currents are caused by electric arcs, the duration of said currents is very short. The duration of arc currents is often much lower than the period corresponding to the frequency of an electrical power distribution system. These fault currents of short duration do not have a very high rms value but are of great nuisance in electrical installations. Moreover, these arc currents can present a danger for people using equipment connected to the power supply system.

Rms value detection does not enable these arc currents to be detected correctly.

Devices exist using peak value detections. These devices can detect arc currents correctly but they are not sufficiently precise to detect currents presenting harmonic components.

OBJECT OF THE INVENTION

The object of the invention is to achieve an earth protection device enabling improved detection of earth fault currents comprising electric arc currents, and also a trip device and a circuit breaker comprising such a device.

A device according to the invention comprises second signal processing means to process a signal representative of an earth fault current connected between said input and the first signal processing means, said second signal processing means supplying to the first signal processing means a second signal representative of an earth fault current having on decrease a gradient lower than a preset gradient limiting value.

In a preferred embodiment, the second signal processing means comprise:
sampling means to sample the first signal representative of an earth fault current,
storing means to store a last value of the second signal representative of an earth fault current.
decrease calculating means to calculate a value with limited decrease connected to the storing means and to means for supplying a gradient limiting value, the value with limited decrease being representative of the last value of the second signal representative of an earth fault current less the gradient limiting value, and
determining means for determining a new value of the second signal representative of an earth fault current connected to the sampling means and to the decrease calculating means.

Advantageously the determining means comprise means for detecting a maximum to supply a new value of the second signal representative of an earth fault current, said second signal being determined according to a maximum value of the first sampled signal or of the limited decrease value.

Preferably the determining means comprise:
means for calculating a difference connected to the storing means and to the sampling means to determine the difference between a value of the first sampled signal and a last value of the second signal,
comparing means to compare said difference with the gradient limiting value and
selection means having inputs connected to the sampling means and to the decrease calculating means and being controlled by the comparing means to supply on output a signal having a limited decrease value if the difference between a value of the first sampled signal and a last value of the second signal is greater than the gradient limiting value.

In a particular embodiment, the gradient limiting value is constant.

According to a first alternative embodiment, the gradient limiting value is variable according to a last peak value of the first signal representative of an earth fault current.

According to a second alternative embodiment, the gradient limiting value is variable according to a time between a last peak value and a subsequent instantaneous value of the first signal representative of an earth fault current.

According to a third alternative embodiment, the gradient limiting value is variable according to a last peak value and to a time between a last peak value and a subsequent instantaneous value of the first signal representative of an earth fault current.

The device preferably comprises processing means implementing a process comprising:
a read step of an input signal representative of an earth fault current.
a step for determining a limited decrease value,
a selection step to supply an output signal representative of an earth fault current, said output signal being with limited decrease if the difference between the input signal and a previous output signal is greater than a limiting value, and
a storing step of the output signal.

Advantageously the process comprises a step for detection of a maximum value between the input signal and the limited decrease value.

An electronic trip device according to the invention comprises an earth protection device as defined above.

A circuit breaker according to the invention comprises an earth protection device as defined above.

BRIEF DESCRIPTION OF THE DRAWINGS

Other advantages and features of the invention will become more clearly apparent from the following description of particular embodiments of the invention given as nonrestrictive examples only and represented in the accompanying drawings in which.

DETAILED DESCRIPTION OF THE PREFERRED EMBODIMENTS

Figure 1:
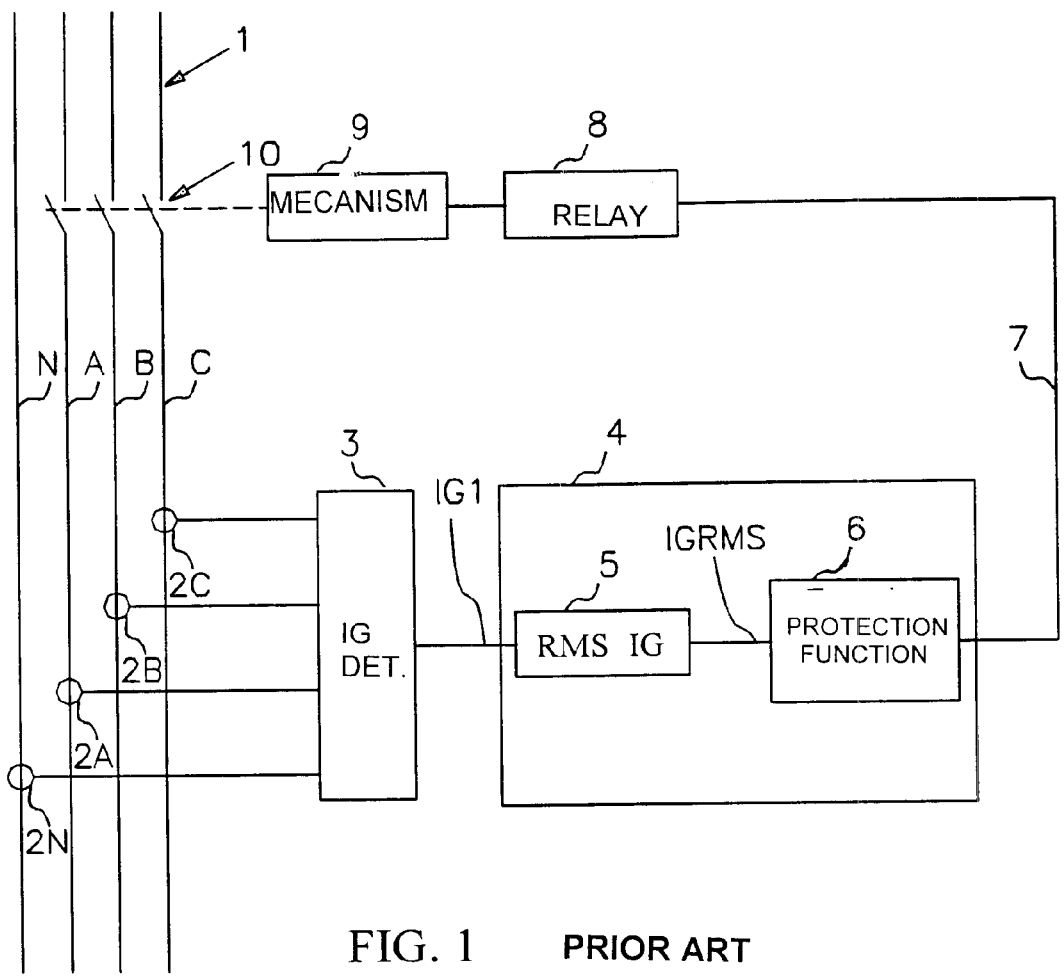
FIG. 1 represents a diagram of a circuit breaker comprising an earth protection device of the prior art.

The diagram of FIG. 1 represents a circuit breaker comprising an earth protection device of the prior art. In this drawing, an electrical power distribution system 1 comprises phase conductors A, B, C and a neutral conductor N.

Measurement of the phase and neutral currents is performed with current transformers fitted on each conductor respectively 2A, 2B, 2C and 2N. The current transformers supply phase and neutral signals to a detection circuit 3 for detection of a zero phase-sequence or earth protection current IG1. Generally the circuit 3 makes a vector sum to determine the current IG1 representative of an earth fault current.

The current signal IG1 is applied to an input of a processing circuit 4 which comprises a preprocessing module 5 to determine an rms value IGRMS of the signal IG1, and a protection function processing module 6.

The processing circuit supplies a tripping signal 7 if the earth fault signal IG1 exceeds a certain threshold for a preset time. The signal 7 is supplied to a relay 8 to command opening of contacts 10 actuated by a mechanism 9. The circuits 3 and 4 and the relay 8 form an electronic trip device for a circuit breaker.

Figure 2:
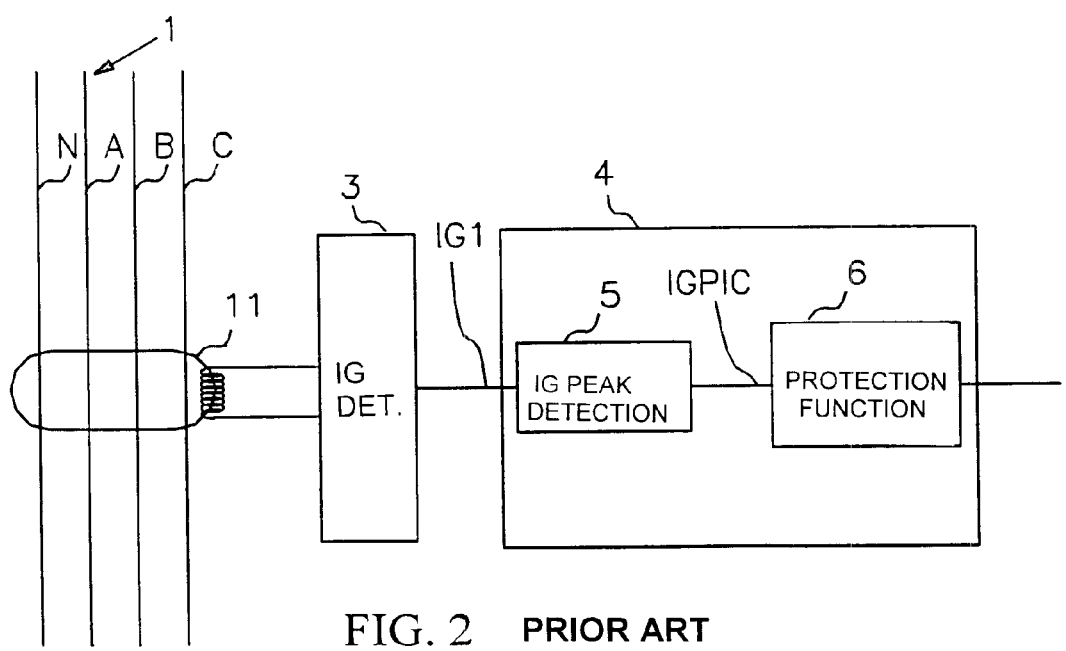
FIG. 2 represents a diagram of an earth protection device of the prior art.

The diagram of FIG. 2 shows a different embodiment. The value of an earth fault current is measured by a current sensor 11 which surrounds the set of phase and neutral conductors. The signal supplied by the sensor 11 is applied to a detection circuit 3 which performs, in this case, in particular shaping and rectifying of the signal. The circuit 3 supplies a signal IG1 representative of an earth fault current to a processing circuit 4.

The circuit 4 of FIG. 2 comprises a preprocessing module 5 to perform peak detection of the earth protection signal and supplies a signal IGPIC to the protection function processing module 6.

When the earth fault current is caused by an electric arc, the duration of said current is short and the rms value preprocessing module does not enable such a fault to be detected correctly. Detection directly in rms value reduces the value of the signal and is not representative of the real nuisances which an arc signal can give rise to. If detection was in peak value as in FIG. 2, the arc currents would then be overestimated and detection of sinusoidal currents containing harmonic components would not be precise.

In a device according to the invention, detection of sinusoidal fault currents comprising harmonic components is precise in particular in rms value and currents comprising impulses of short durations such as currents representative of arc faults are estimated at values higher than those of their rms values.

Figure 3:
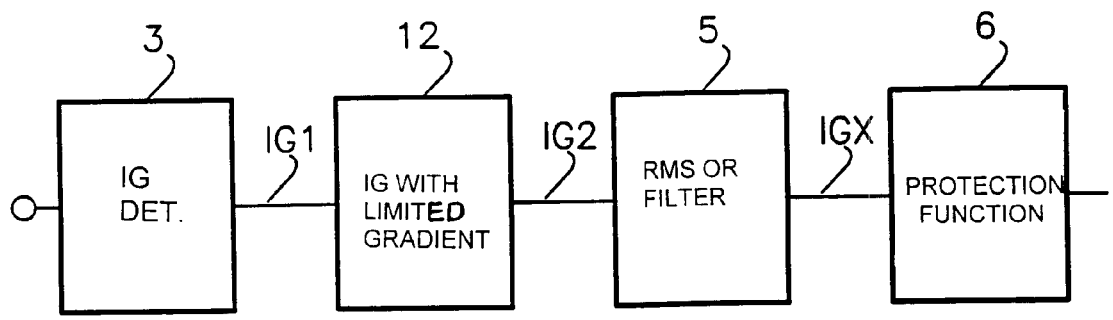
FIG. 3 represents a diagram of an earth protection device according to an embodiment of the invention.

In an embodiment of the invention represented in the block diagram of FIG. 3, the earth protection device comprises a processing module 12 connected between the detection circuit 3 and a preprocessing module 5. The module 12 receives the signal IG1 representative of an earth fault signal and supplies a second signal IG2 representative of an earth fault having on decrease a gradient limited to a preset value.

The gradient with limited decrease is preferably greater than a gradient on decrease of a sine wave. Thus the signal IG2 can decrease more quickly than a sine wave to preserve the shape of the sinusoidal signals.

The preprocessing module 5 preferably detects an rms value IGX of the second signal IG2. In said module 5, an approximate rms value IGX can also be obtained by filtering or directly integrated in the protection function of the module 6.

Figure 4A:
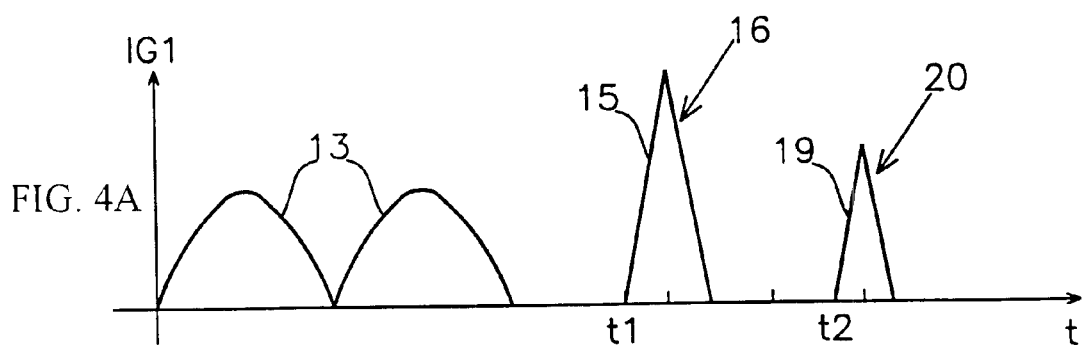
FIGS. 4A and 4B show signals in an earth protection device according to an embodiment of the invention.
Figure 4B:
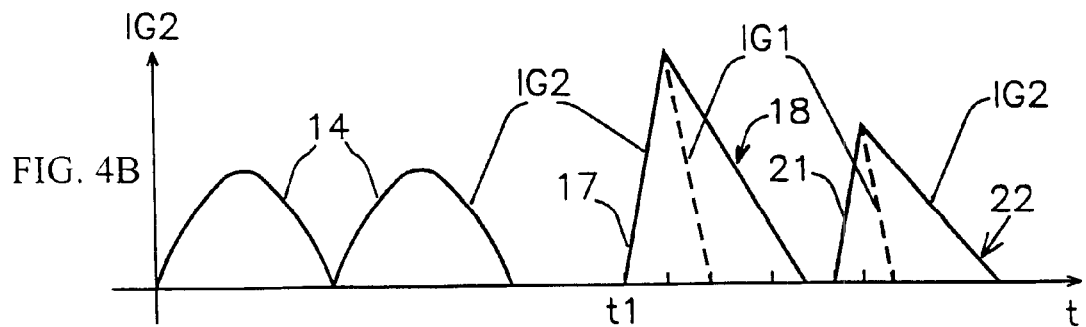

FIG. 4A shows a rectified signal IG1 representative of an earth fault and FIG. 4B shows a signal IG2 supplied by the module 12.

In FIGS. 4A and 4B, two first half-waves 13 of the signal IG1 are sinusoidal. If the limited gradient is steeper than a sinusoidal gradient, the signal IG2 has appreciably the same form as the signal IG1. Thus the two first half-waves 14 of the signal IG2 of FIG. 4B resemble the half-waves 13.

At a time t1, a first signal 15 representative of an arc occurs. This signal has a high amplitude and a limited duration. In this case, the gradient on decrease, represented by a part 16 of the curve, is very steep. The signal IG2 then comprises at the time t1 a signal 17 corresponding to the signal 15 of the signal IG1. The increasing part of the signal 17 resembles the increasing part of the signal 15, but a decreasing part 18 has a gradient with limited decrease. The signal 17 of IG2 representative of an arc has a longer duration than that of the signal 15 and consequently the rms or mean value of IG2 is increased when the signal IG1 is representative of an arc signal.

At a time t2, a second signal 19 representative of an arc signal occurs on IG1. This signal also has a very steep gradient 20 on decrease. It will be replaced on output on IG2 by a signal 21 having a limited gradient on decrease 22.

Figure 5:
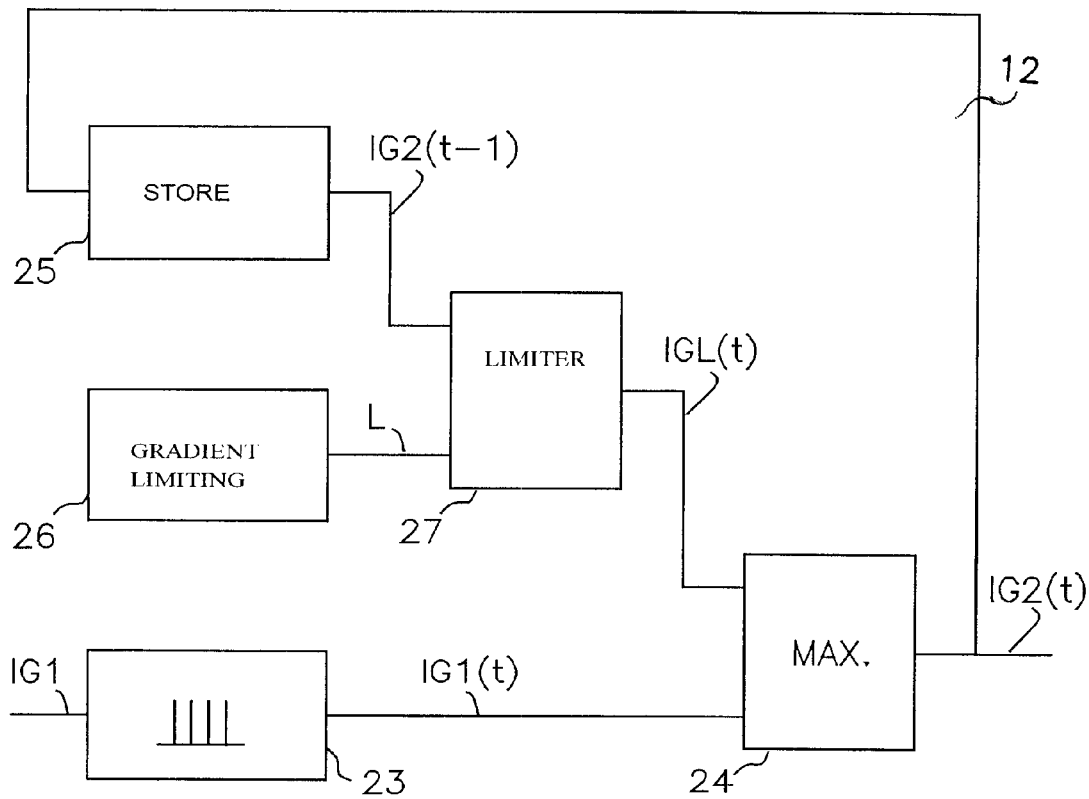
FIG. 5 represents a diagram of a processing module of an earth protection device according to an embodiment of the invention.

FIG. 5 shows an embodiment of a module 12 for a device according to the invention. In this embodiment, the signal IG1 representative of a zero phase-sequence current is applied to the input of a sampling circuit 23 which supplies a sampled signal IG1(t) to a first input of a maximum detector 24. The maximum detector 24 supplies a sampled output signal IG2(t).

A storage circuit 25 receives the signal IG2(t) on input and supplies on output the previous stored sample IG2(t-1) of the signal IG2(t).

A parameter setting module 26 supplies a value L of the limiting gradient on decrease. A limiting module 27, receiving on input the previous sample IG2(t−1) from the storage circuit 25 and a value L of the gradient from the parameter setting module 26, determines a sample IGL(t) having a limited value on decrease and supplies said sample IGL(t) to a second input of the maximum detector 24. The signal IGL(t) is determined according to the formula $$IGL(t)=IG2(t-1)-L.$$

The maximum detector 24 supplies the higher signal between the input signal IG1(t) and the signal of the value limited on decrease IGL(t). Thus, as soon as the signal IG1(t) has a gradient on decrease which exceeds the limited gradient of value L, the detector 24 applies the signal IGL(t) on output instead of the signal IG1 (t). The signal IG2(t) can be expressed as follows :

$$IG2(t)=\text{Max}\ [IG1\ (t);\ IGL(t)].$$

Figure 6:
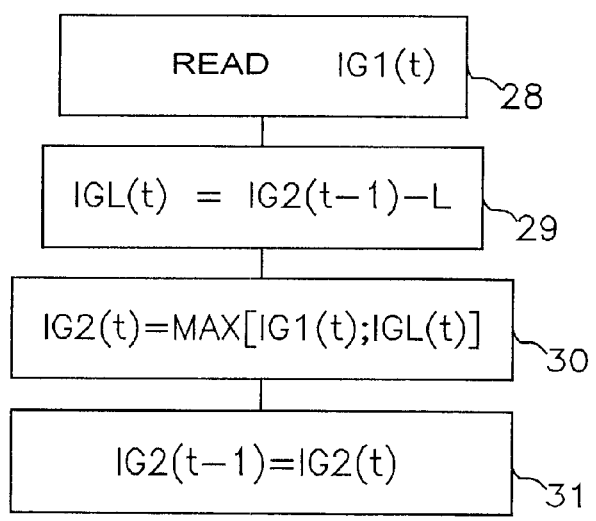
FIG. 6 represents a flowchart able to function in a processing module of an earth protection device according to an embodiment of the invention.

FIG. 6 shows a flowchart of operation of a module 12. In this flowchart, a sampling of the signal IG1(t) is made at a read step 28. A value IGL(t) limited on decrease (IGL(t)= IG2(t−1)−L) is determined in a step 29. Then, in a step 30, the maximum value between the two values IG1(t) and IGL(t) is attributed to IG2(t). At the end of the cycle, a storage step 31 stores the last value of IG2(t) in memory so that IG2(t−1) is equal to IG2(t).

Figure 7:
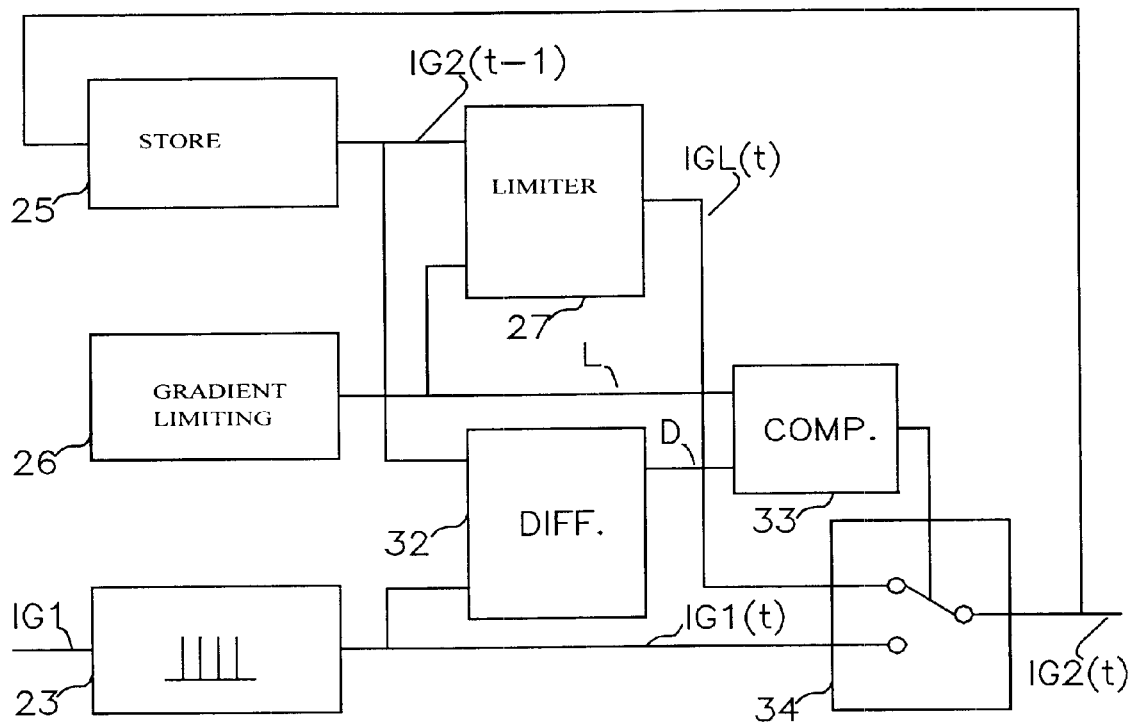
FIG. 7 represents another diagram of a processing module of an earth protection device according to another embodiment of the invention.

FIG. 7 shows another embodiment of a module 12. In this embodiment, the module 12 comprises appreciably the same elements as the module of FIG. 5. The maximum detector 24 is replaced by a module 32 to determine a difference D between the stored signal IG2(t−1) and the sampled signal IG1(t) thus D=IG2(t−1)−IG1(t). A comparator 33 compares this difference D with the gradient limiting value L, and a selector 34 commanded by the comparator 33 supplies the signal IG2(t) on output. The comparator 33 receiving the signal IG1(t) from the sampler 23 and the signal IGL(t) from the limiting module 27 commands the selector 34 in such a way as to apply to the output signal IG2(t) the value IG1(t) if the difference D is lower than the limit L or the value IG1(t) if the difference D is greater than the limit L.

Figure 8:
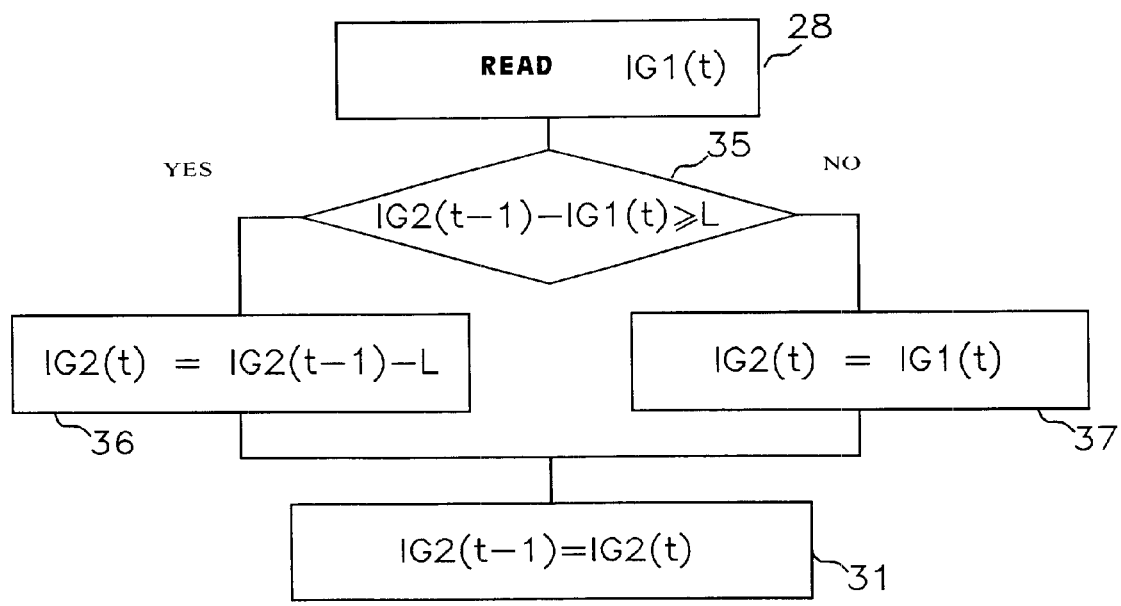
FIG. 8 represents another flowchart able to function in a processing module of an earth protection device according to another embodiment of the invention.

FIG. 8 shows another embodiment of a flowchart able to operate in a module 12. This flowchart comprises the read step 28 and store step 31 as in the module of FIG. 6. After the read step 28 of the signal IG1 which supplies a sample IG1(t), a compare step 35 compares the gradient limiting value L and the difference D between the stored value IG2(t−1) and the value of the sample IG1(t). If the difference D is greater than or equal to the value L, a step 36 attributes a limiting value to the output signal IG2(t) such that IG2(t) is equal to IG2(t−1)−L. If the difference D is lower than the value L, a step 37 attributes the value of the input signal IG1 (t) to the output signal IG2(t).

The gradient limiting value L is preferably constant. It can be preset in fixed manner or depend on the last peak value of the earth fault signal IG1.

The gradient limiting value L can advantageously be variable according to the time which separates it from the last peak of the earth fault signal IG1. For example the gradient can be very low close to the signal peak and become high when the time increases with respect to the last peak. In another embodiment, the gradient limiting value L can be variable according to the value of the last peak and to the time which separates the samples of IG1 (t) from the last peak of said signal IG1 (t).

Figure 9:
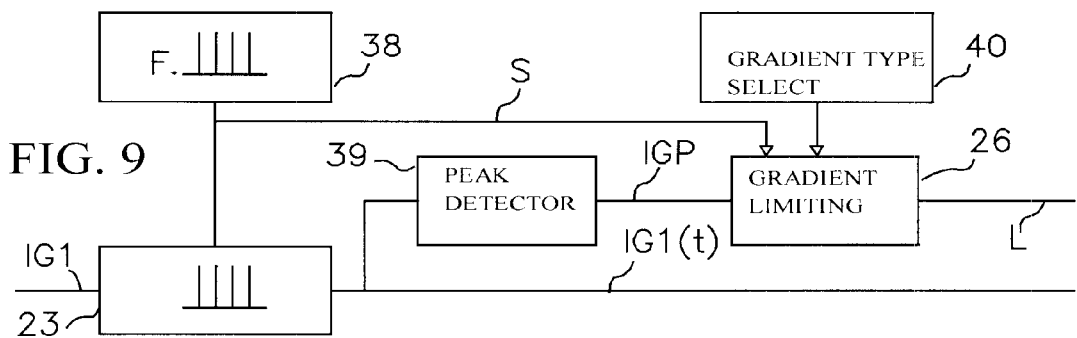
FIG. 9 represents a diagram of a limited gradient modification device able to function in a processing module of an earth protection device according to an embodiment of the invention.

FIG. 9 shows a diagram of a gradient value modification device. This device comprises a sampling command circuit 38 to command the sampler 23 and supply sampling information S to the parameter setting module 26. This device also comprises a peak detector 39 receiving the signal IG1(t) and supplying a signal IGP representative of the last peak to the module 26. Selection of the type of gradient can be performed with a selection module 40 connected to the module 26.

Figure 10A:
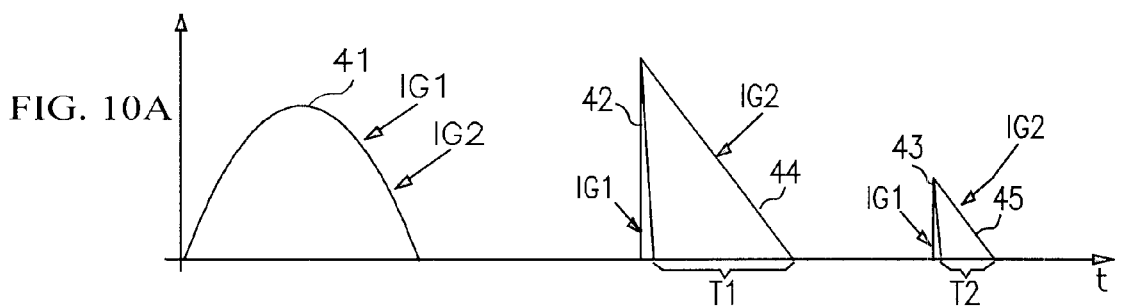
FIGS. 10A to 10D show signals of different gradient limiting types of processing modules of earth protection devices according to embodiments of the invention.
Figure 10B:
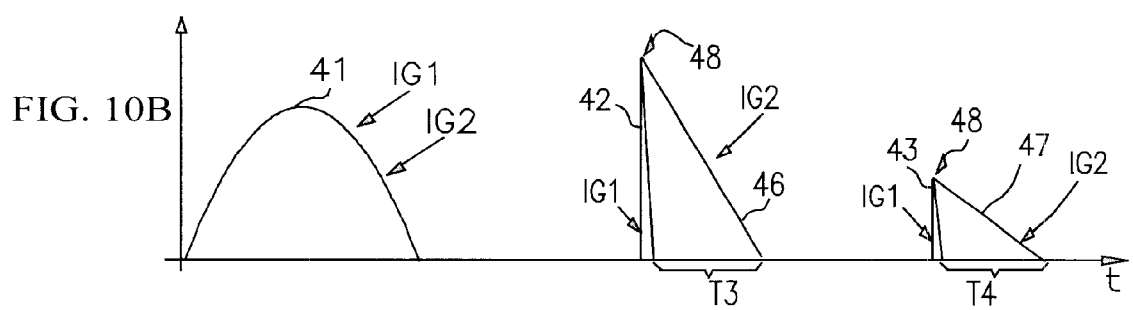
Figure 10C:
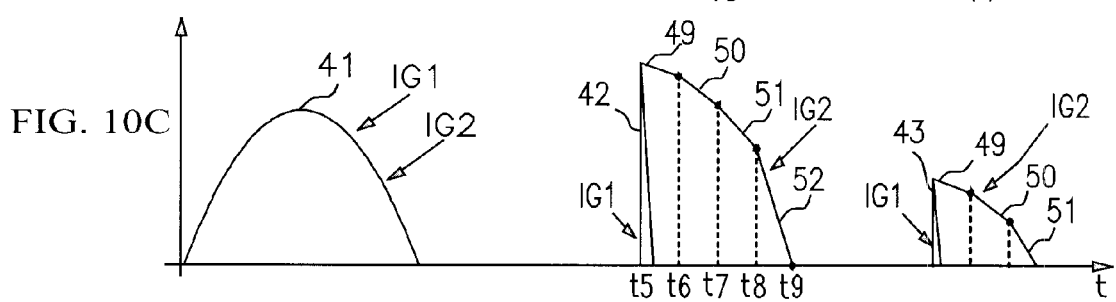
Figure 10D:
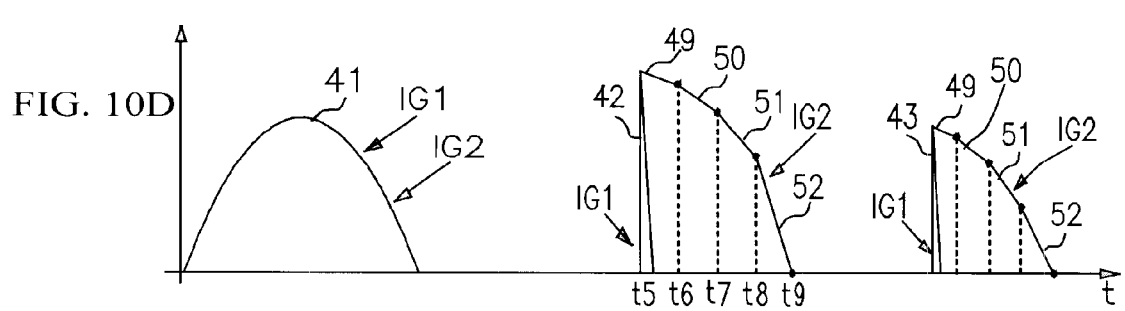

FIG. 10A and 10D illustrate signals corresponding to different types of limiting gradients on decrease. In each figure, there is a first sinusoidal signal 41 for which the signal 1G2 is appreciably equivalent to the signal IG1 and a first arc signal 42 of high amplitude and a second arc signal 43 of low amplitude for which the signal IG2 has a limited gradient on decrease lower than the decreasing gradient of the signal IG1.

In FIG. 10A, the gradient with limited decrease represented by the signals 44 and 45 is constant.

In FIG. 10B, the gradient on decrease is different for the signals 42 and 43. For the signal 42 a gradient 46 has a high value, and for the signal 43 a gradient 47 has a low value. The gradient can advantageously depend on the last peak 48 of the signal IG1. Another advantage of control of the gradient is mastery of the time required for the signal IG2 to return to zero.

For example, in FIG. 10A the times T1 and T2 are different with identical gradients 44 and 45, whereas in FIG. 10B the times T3 and T4 are appreciably equivalent with different gradients 46 and 47.

In figure 10C, the gradient on decrease is variable with respect to a time between the last peak and a subsequent value of the signal IG2. In the examples of figure 10C, the gradient has a first value in a portion 49 between times t5 and t6, a second value in a portion 50 between times t6 and t7, a third value in a portion 51 between times t7 and t8, and a fourth value in a portion 52 between the times t8 and t9. The times t5 to t9 can be determined according to the number of samples separating an instantaneous signal from the time of the last peak 48.

In FIG. 10D, the gradient on decrease is variable with respect to a time as in FIG. 10C and also with respect to the value of the last peak. The portions 49 to 52 can thus be different at each signal.

A gradient on decrease according to FIG. 10D can advantageously simulate a curve of parabolic type.

What is claimed is:

1. An earth protection device comprising:

an input for receiving a first signal representative of an earth fault current, first signal processing means for processing a second signal representative of an earth fault current, means for processing protection functions connected to the first signal processing means, and second signal processing means connected between said input and said first signal processing means for processing the first signal representative of the earth fault current and for supplying to the first signal processing means the second signal representative of the earth fault current, said second signal having a gradient at decreasing second signal values, the gradient being lower than a preset gradient limiting value for increasing a second signal value over an RMS value when the fault current comprises pulses of short duration.

2. The earth protection device according to claim 1, wherein the second signal processing means comprise:
   means for supplying a gradient limiting value,
   sampling means for sampling the first signal representative of the earth fault current,
   storing means for storing a last value of the second signal representative of the earth fault current,
   decrease calculating means for calculating a value with limited decrease, said decrease calculating means connected to the storing means and to said means for supplying a gradient limiting value, the value with limited decrease being representative of the last value of the second signal representative of the earth fault current less the gradient limiting value, and
   determining means for determining a new value of the second signal representative of the earth fault current connected to the sampling means and to the decrease calculating means.

3. The earth protection device according to claim 2, wherein the determining means comprise means for detecting a maximum to supply a new value of the second signal representative of the earth fault current, said second signal being determined according to a maximum value of the first sampled signal or of the limited decrease value.

4. The earth protection device according to claim 2, wherein the determining means comprise:
   means for calculating a difference between a value of the first sampled signal and a last value of the second signal, said means for calculating a difference being connected to the storing means and to the sampling means,
   comparing means for comparing said difference with the gradient limiting value, and
   selection means having inputs connected to the sampling means and to the decrease calculating means and being controlled by the comparing means, said comparing means for supplying as output a signal having a limited decrease value if the difference between a value of the first sampled signal and a last value of the second signal is greater than the gradient limiting value.

5. The earth protection device according to claim 1, wherein the gradient limiting value is constant.

6. The earth protection device according to claim 1, wherein the gradient limiting value is variable according to a last peak value of the first signal representative of the earth fault current.

7. The earth protection device according to claim 1, wherein the gradient limiting value is variable according to a time between a last peak value and a subsequent instantaneous value of the first signal representative of the earth fault current.

8. The earth protection device according to claim 2, wherein the gradient limiting value is variable according to a last peak value and to a time between a last peak value and a subsequent instantaneous value of the first signal representative of the earth fault current.

9. The earth protection device according to claim 2, wherein the second processing means includes means implementing:
   for reading an input signal representative of the earth fault current,
   for determining a limited decrease value,
   for supplying an output signal representative of the earth fault current, said output signal having a limited set of decreasing output signal values if the difference between the input signal and a previous output signal is greater than a limiting value, and
   for storing the output signal.

10. The earth protection device according to claim 9, wherein the second processing means also includes means for detection of a maximum value between the input signal and the limited decrease value.

11. An electronic trip device comprising an earth protection device according to claims 2.

12. A circuit breaker comprising an earth protection device according to claim 2.

* * * * *